United States Patent Office 3,692,580
Patented Sept. 19, 1972

3,692,580
PROCESS FOR THE PRODUCTION OF
STARCH SYRUPS
Mamoru Hirao and Masakazu Mitsuhashi, Okayama,
Japan, assignors to Hayashibara Company, Okayama,
Japan
No Drawing. Filed Oct. 23, 1970, Ser. No. 83,651
Claims priority, application Japan, Oct. 24, 1969,
44/85,577
Int. Cl. C13k 1/06
U.S. Cl. 127—29         8 Claims

ABSTRACT OF THE DISCLOSURE

A starch syrup having a low D.E., a low viscosity and good chemical stability is prepared by adding to a first starch syrup prepared by an acid or an enzyme (such as alpha-amylase) hydrolysis of starch, a second starch syrup prepared from a starch hydrolysis involving the action of alpha-1,6-glucosidase. The second syrup may be hydrogenated or the syrup mixture may be hydrogenated.

---

Starch syrups with low degrees of hydrolysis and high viscosities are produced by hydrolyzing aqueous suspensions of common tuber or root starches or cereal starches or glutinous starch with acid or enzymes or with both. The present invention relates to processes for improvement of viscosities, handling of high viscosity starch syrups and stabilities of low viscosity starch sprups by admixing (1) starch syrups, which contain as their constituents linear chained oligosaccharides and dextrins and are obtained by subjecting starch suspensions to the actions of various kinds of enzymes or to those of combinations of acids and α-1,6-glucosidases, or (2) hydrogenates of these starch syrups to starch syrups with low hydrolysis degrees and high viscosities.

Starch syrups on the market today are acid or enzyme hydrolyzates of starches. Their hydrolysis degrees are expressed as percentage reducing sugar content, i.e. D.E. (dextrose equivalent). High conversion starch syrups with D.E. over 40 are used in various food products as sweeteners, whereas those of low hydrolysis degree, less than D.E. 40, have wide applications owing to their many useful characteristics, such as low sweetness, high viscosity, low hydroscopicity, non-crystallization, superior water retention, flavor retention, heat stability and chemical stability. In other words these products are utilized extensively as additives or basic lubricants for nutrient infant foods, carriers for synthetic sweeteners, granulating assistant agents for flavour powder and powdered coffee, dispersing agents and bodying agents for soups, puddings, other confectioneries and artificial cream. However, in order to meet the requirements for these applications and to increase their heat and chemical stabilities, it is necessary to lower the hydrolysis degree to a D.E. of less than 30. For accomplishment of this purpose, starch milk is hydrolyzed by acids or starch converting enzymes and the resultant starch syrups, hydrolysis of which are suspended at D.E. 20–30, are used for these applications. Although such starch syrups have hardly any sweetness, the syrups are non-crystallizable and stable to heat and nitrogeneous compounds, their extremely high viscosity makes handling occasionally difficult, and moreover deteriorate the properties of the products and the palatabilities of the foods in which they are used.

One objectivde of the present invention is to adjust the above mentioned excess viscosity to an optimum level for various applications, and on the other hand promoting other properties of the syrups. Another objective is to increase the stabilities to heat and nitrogen compounds in order to maintain the colors of the products, in which the said starch syrups are used, to an optimum level. A further objective is to increase the jellied strength. Secondary purposes of the decrease of viscosity are to facilitate heat treatment, prevent inevitability of discoloration, and maintain and promote the characteristics, such as crystallization inhibitive and flavor retentive properties.

The present invention displays its effectiveness in eliminating the disadvantages and in promoting further the advantages of the above described common starch syrups. These are realized (a) by admixing to common starch syrups, suitable amounts of (1) low viscosity and low D.E. starch syrup, which is to be described later and consists of only linear chained dextrins, or (2) non-reducing starch syrups, which are hydrogenates of the said starch syrups with low viscosity and low D.E., or (b) by obtaining non-reducing starch syrups by hydrogenation of the syrup mixture.

The starch syrups to be mixed with common starch syrup, with the above mentioned purposes, are starch syrup which has as its exclusive constituent linear chained oligosaccharides and dextrins with no branched structure, or non-reducing starch syrups which are hydrogenates of the said syrups. In the cases of starch syrups, which are obtained by acid or enzyme hydrolysis of starch, the 1,6-glucosidic linkages present in amylopectin still remain as it is after hydrolysis and form into branched oligosaccharides and dextrins, thus causing increase of viscosity. Starch syrups applied in this invention contain no such branched structure, therefore these syrups have lower viscosity and fluidity, as compared to the common starch syrups with the same average degree of polymerization or D.E. Conversion of these low viscosity starch syrups into non-reducing starch syrups by hydrogenation with a catalyst, further decreases the viscosity of the syrups. Because of their non-reducing properties, their chemical stabilities are substantially improved. Thus a new variety of starch syrup, not previously reported in any literature or produced is obtainable.

The present invention which relates to processes for the production of the above described starch syrups consisting only of linear chained molecules, will become apparent as the description proceeds. All percentages are by weight unless specified otherwise. Starch suspension with concentration less than 40% is made with any variety of starches, corn starch, amylomaize starch, potato starch, sweet potato starch etc. The suspension is liquefied by heating at 160–130° C., or by heating at 60–95° C. with the addition of α-amylase, or by heating with the addition of acid. The thus obtained low D.E. liquefied solution with D.E. less than 20 is subjected to the action of α-1,6-glucosidase to hydrolyze only the 1,6-glucosidic linkages which are branched linkages of amylopectin into maltodextrin, or amylose, and is converted into linear chained amylose. Prior to the hydrolysis reaction or during the hydrolysis or after the hydrolysis, the α-1,4-linkages of starch are hydrolyzed with α and β-amylases to obtain a final D.E. of 25–35. Although the resultant starch syrups have lower glucose content, consist of oligosaccharides or dextrins, and are stable and of low D.E. with less sweetness, their viscosities are greatly lower and the concentration and mixing procedure can be conducted with more ease, than starch syrup obtained by the conventional hydrolysis method with acid or α-amylase.

The α-1,6-glucosidases used for the production of the said starch syrups are obtainable from culture broths of the following strains in pure state; *Escherichia intermedia* (ATCC 21073), *Pseudomonas amyloderamosa* (ATCC 21262), various strains of Actinomycetes (e.g. IFO 12208), strains belonging to genera of *Aerobacter aerogenes* (ATCC 8724), 14 strains of Micrococcus, Nocardia, and Lactobacillus.

The reaction conditions of these enzymes are: the concentration degree of liquified starch, 20–40%; temperature, 40–50° C. Although the pH varies from enzyme to enzyme, the range is 4.5–6.0. However only in the case of *Pseudomonas amyloderamosa*, a relatively lower pH, less than 5.5, is preferable. The starch hydrolyzate thus obtained is a stable low conversion starch syrup with low sweetness. However, in order to produce a more stable starch syrup, a 40–50% aqueous solution of the starch syrup is hydrogenated with a catalyst such as Raney-nickel or others, at under 150° C. and hydrogen pressure of within 130 atm., maintaining the pH at weak alkaline less than neutral. The resultant product causes no decomposition of sugars and only the aldehyde radicals are hydrogenated to sugar alcohols, thus stable starch syrups with no reducing power are obtained and the viscosity of the product is much more reduced. Because the thus obtained starch syrup consists only of linear molecules which have no branched structure, as can be expected from the structures of the said syrup, the viscosity of the syrup solution is lower and its reducing power is less than those of common starch syrups in which large amounts of branched dextrins are present. The said starch syrups have lower tendencies of causing coloration by heating or Maillard reaction by protein. The reaction product which comprises hydrogenated sugar alcohol structures and in which aldehyde radicals are absolutely absent, has ideal properties such as higher stabilities to heat and nitrogen compounds, and moreover its viscosity is much more decreased. Therefore these said starch syrups possess the optimum properties required for raw material for the production of food products.

Hereinafter the effectiveness of blending to the before mentioned common acid or enzyme low conversion starch syrups the above mentioned linear chained starch syrups will be described. As regards to the common low conversion starch syrups currently on the market, hydrolyzates of D.E. 20–30 with low sweetness, which are produced by hydrolysis of starches with acids or occasionally with α-amylase are used. Also low conversion starch syrups with high solubility which are enzymatic hydrolyzates of waxy corn starch are used. All of these low conversion starch syrups are superior in respects of non-crystallization, low hygroscopicity, its low sweetness, humectant properties, flavor retention, and thus are used for various purposes: raw material and additives for production of various confectioneries and foods. This viscosity is, however, excessive. In production of candies these syrups that cause coloration by heating owing to their viscosities become obstacles in the drying procedures and occasionally impart undesirable effects to the foods and drinks themselves. To accomplish elimination of these disadvantages, the inventors attempted to control the viscosities of these syrups by admixing the above mentioned linear chained starch syrups of low viscosities to such common starch syrup of low conversion degrees.

Studies on the properties of the products, obtained by blending 30–50% of linear chained low viscosity starch syrups of D.E. 30 to the low acid conversion starch syrups of D.E. of about 25, showed that the viscosities of the starch syrup mixtures were significantly decreased and the procedures of heating, concentration, mixing etc. during the production of foods were greatly facilitated. Thus coloration and discoloration were completely prevented. The properties of non-crystallization, homogeneous dispersion etc. were greatly improved. By varying the blending rate, the viscosities of the products were controllable. The tendency of improvement of other characteristics of the products were found effective in expanding the applications for common low conversion starch syrups, simultaneously, the limit of blending was extended, which are unneglectable advantages effective for quality improvment of the final products and reduction of production costs. Such effects of blending can be displayed considerably not only in extremely low conversion starch syrup but also in moderate D.E. starch syrups with D.E. of 30–40, thus effective in varying the delicate properties of foods.

The above effects can be emphasized by using nonreducing starch syrups obtained by hydrogenating the linear chained and low viscosity starch syrups. In the cases of these non-reducing starch syrups, their viscosities are reduced, and owing to their non-reducing properties, they are chemically very stable and of course heat stable. Admixing of these non-reducing starch syrups lower the viscosities of common low conversion starch syrups. This admixture is also effective in improving their properties of non-crystallization, flavour retention and moisture retention, as well as stabilizing them.

A much more effective method than the above admixture is to hydrogenate starch syrup mixtures comprising common low conversion starch syrups and linear chained low conversion starch syrups. Thus the constituents of the starch syrup mixture can be converted to non-reducing alcohols and to chemically stable starch syrups. The resultant products are ideal low conversion starch syrups in every respect.

As described above, the blended product of low viscosity starch syrups comprising linear chained molecules, which have different structures than common starch syrups, not only display arithmetic average intermediate viscosity of the both, but have distinct advantages which result in decreasing their viscosities more than expected and facilitate greatly their handlings. These are points of great significance. Secondly by blending common starch syrups and starch syrups of linear chained molecules excellent results are obtainable; lowers the hygroscopicity of the resultant products and maintains their moisture retention without any hindrance to their flavour retention properties. Spray drying speed can be accelerated when this product is added to various kinds of powdered foods. When used as raw materials for bakery products, the fermentation period can be shortened and when used in jellies, the advantages of linear molecular starch syrup, owing to the constituent molecular structure, are fully displayed; acceleration of drying speed, increase of jellied strength and prevention of deformation.

When added to powdered foods and soup, the hydroscopic speed of the products in dry state is low, whereas the water solubility of the products is high, the viscosity of aqueous product solution is not excessive and a palatability of desirable viscosity is imparted to the products. These are unexpected characteristics of the said starch syrups, that were considered difficult to control with common starch syrups.

Thus the superiorities of the said starch syrups which are higher quality products than a mere mixture was recognized.

EXPERIMENTALS

Example (1–a).—The production of acid conversion starch syrup

To a 40% starch slurry of purified corn starch was added 0.3% of oxalic acid per weight of starch. According to usual methods the slurry was charged into a converter, saccharified by charging to the slurry raw steam at 2 atm. for 15 minutes, and then released into a neutralizing tank, where it was neutralized with calcium carbonate to pH 5. Subsequently to the resultant product was added active carbon 0.3%, discolored, filtered and concentrated. Refined starch syrup with a moisture content of 20% was obtained, after deionization through ion-exchange towers and final concentration.

(1–b).—The production of enzyme conversion starch syrup

A starch slurry was a concentration degree of 35% and pH of 6.0 was prepared from sweet potato starch after washing with water and purification. Twelve units of liquefying amylase (α-amylase preparation, a product of Nagasase Sangyo Kabushiki Kaisha) per gram starch was added to the starch slurry. Then the resultant mixture was charged into a Votator with pressure, where the mixture was heated with raw steam at 85–90° C. and gelatinized homogeneously. The product was passed through a holding tank maintained at 80° C. to permit decomposition. After the enzymatic reaction was suspended by heating when the mixture reached D.E. 25–35, the reaction mixture was purified with active carbon and ion exchange resin, thus a colorless and viscous starch syrup was obtained. The product had a generally higher viscosity than common starch syrups and was difficult to handle.

(1–c).—The production of enzyme conversion syrup from waxy starch

A 30% waxy corn starch slurry was prepared after washing with water and purification. Following liquefaction of the slurry according to (1–b) at pH 6.0 and at 90° C. with liquefying enzymes, the resultant was allowed to stand at 80° C. and the degree of hydrolysis proceeded. Upon reaching a desirable D.E. the product was heated to over 100° C. and filtered. The clear solution was purified with active carbon and ion exchange resin, and concentrated. The product thus obtained had a good solubility, a high viscosity and a difficulty of turbid formation.

(1–d).—The production of starch syrup comprising linear chained molecules

A 30% starch slurry was prepared following purification. The slurry was adjusted to pH 6.0, to it was added 15 units of liquefying enzyme (a product of Nagase Sangyo K.K.) per gram starch, liquefied with a continuous liquefier at 90° C., and a liquefaction solution with a D.E. of 2.0 was obtained. The enzyme was inactivated by heating to 125° C., and cooled rapidly to 50° C. by injecting the solution into a vacuum cooler, simultaneously charging 25 units of α-1,6-glucosidase obtained from a culture broth of strains of Escherichia intermedia (Japanese Pat. No. 555,242) per gram starch with sufficient stirring. The mixture was incubated for 30 hours at pH 6.0, 45–50° C. Following subsequent heating of the resultant saccharified solution, hydrolysis was performed with adding 10 units of α-amylase at 75° C. After the desirable degree of hydrolysis was obtained, the solution was purified with active carbon and ion exchange resin as described in the preceding examples, and concentrated. The starch syrup product contained no α-1,6-linkages. The product consisted of only linear chained molecules and has a lower viscosity than common starch syrup with the same D.E.

(1–e).—Non-reducing starch syrup

Following sufficient purification, the starch syrup obtained by (1–d) was charged into an autoclave at a concentration degree of 20–50%, and 10% Raney-nickel catalyst per weight of anhydrous sugar was added. For adjustment of pH, a small amount of calcium carbonate was added. Hydrogen was charged to the mixture at a hydrogen pressure of 100 kg./cm.$^2$ with vigorous stirring. The temperature was elevated to 100° C. and the reaction was continued until the absorption of hydrogen was suspended. Five hours later the nickel catalyst was removed from the reaction solution by filtration and the nickel ions were removed with ion exchange resin, thus a colorless solution was obtained. Analytic results showed that this reduction product had no reducing property, completely converted into sugar alcohols and was not subject to hydrolysis of dextrin molecules. The viscosity of this reduction syrup was lower than that of the common starch syrups. Because this reduction syrup consisted of sugar alcohols with no reducing ends, it was stable to heat and nitrogen compounds, and caused no coloration at elevated heating up to 190° C.

Example 2.—Various blended starch syrups and their characteristics

To the common starch syrups (1–a), (1–b), (1–c) were admixed linear chained starch syrup and non-reducing starch syrup (1–d), (1–e), at a rate of 30–50% as dry substance respectively and the properties of the mixtures were compared. The results are given in Table 1. Viscosities were determined with a B-type rotating viscosimeter. Candy tests to determine their heat resistance, were performed by placing 200 g. starch syrup in a regulation copper pan, heating and concentrating the syrup.

The results given in Table 1 are the temperature that caused coloration.

TABLE 1

| No. | Variety of— Common starch syrup | Variety of— Added starch syrup | Added syrup's rate (percent) | Moisture content (percent) | D.E. | Viscosity (cp.) | Candy test (° C.) |
|---|---|---|---|---|---|---|---|
|  | 1–a$_1$ |  | 0 | 25 | 25.0 | 2,300 | 130 |
| 1 | 1–a$_1$ | 1–d | 30 | 25 | 26.8 | 1,700 | 135 |
| 2 | 1–a$_1$ | 1–d | 50 | 25 | 28.0 | 1,500 | 140 |
| 3 | 1–a$_1$ | 1–e | 50 | 25 | 13.0 | 1,350 | 145 |
|  | 1–a$_2$ |  | 0 | 25 | 35.0 | 1,200 | 135 |
| 4 | 1–a$_2$ | 1–d | 30 | 25 | 33.8 | 1,150 | 140 |
| 5 | 1–a$_2$ | 1–d | 50 | 25 | 34.0 | 1,130 | 143 |
| 6 | 1–a$_2$ | 1–e | 50 | 25 | 17.5 | 1,050 | 145 |
|  | 1–b |  | 0 | 25 | 31.0 | 1,900 | 130 |
| 7 | 1–b | 1–d | 30 | 25 | 31.0 | 1,500 | 140 |
| 8 | 1–b | 1–d | 50 | 25 | 31.0 | 1,400 | 142 |
| 9 | 1–b | 1–e | 50 | 25 | 16.0 | 1,200 | 145 |
|  | 1–c |  | 0 | 25 | 25.0 | 2,500 | 125 |
| 10 | 1–c | 1–d | 30 | 25 | 26.8 | 1,800 | 135 |
| 11 | 1–c | 1–d | 50 | 25 | 28.8 | 1,500 | 140 |
| 12 | 1–c | 1–e | 50 | 25 | 13.0 | 1,300 | 145 |

As shown in Table 1, (1–a) and (1–b) were starch syrups with very high viscosities and when added to other foods, their low hygroscopicity helped make these syrup mixtures effective stabilizers and their viscosities were excessively high. The additions of (1–d) and (1–e) to these starch syrups lowered their viscosities and made these starch syrups easy to handle as in the case of moderate conversion starch syrups. Thus used as additives for powdered foods, or as ingredients of soups they imparted desirable viscosities and in powdered state facilitated drying and shortened the drying time. In addition these products imparted desirable viscosities to the soups. With regard to sweetness, this mixing, there was imparted practically no increase of sweetness and even the hygroscopicity of the obtained products was improved. When used as ingredients for infant foods the above syrups accelerated their dissolving rates and displayed their efficiencies as stable flavor retention agents. In addition they accelerated the speed of drying of jellies and their effects of preventing deformation were great. Particularly because the blended non-reducing starch syrups No. 3 and No. 9 had low reducing properties and their viscosities were much lower, their crystallization preventive effects and humidity preventive properties were great when added to candy drops. There was no effect of coloration caused by heating.

The addition of the syrups adjusted plasticity and was effective in improving the qualities of boiled fish paste products, Kamaboko and Chikuwa. Starch syrups No. 10, 11 and 12 exhibited similar effects. Particularly they were suitable materials that imparted excellent moisture retentive properties and transparences to Japanese style confectioneries, candy drops, etc. The D.E. of syrups No. 4, 5 and 6 were rather high, however, their properties of moisture retention, flavor retention, emulsifying dispersion, etc. can be utilized generally for the production of Japanese style confectioneries, artificial creams etc. Thus it is seen that the excessive viscosities of common low conversion starch syrups are reduced to preferable levels and their inherent superiority, low sweetness, stability to heat or nitrogenous compounds, and flavor retention are effective in holding down the hygroscopicities and improving the drying properties of confectioneries. Thus these syrups proved effective in improving the characteristics required in the production of confectioneries.

Example 3.—The production of non-reducing mixed sugars

Starch syrup No. 5 described in Example 2 was an acid liquefied conversion starch syrup, and linear chained low conversion starch syrup which were mixed 50:50. The pH of this syrup mixture was adjusted at a concentration degree of 50% in accordance with the method described in Example 1. The syrup was completely hydrogenated employing Raney nickel catalyst at less than 150° C. and hydrogen pressure within 130 kg./cm.$^2$. Upon removal of the employed catalyst, decoloration and deionization, a colorless and transparent starch syrup was obtained. Since the syrup was absolutely nonreductive and contained large amounts of linear chained dextrins, the viscosities of the product were low and the syrup exhibited most excellent properties of low hygroscopicity, non-crystallization and moisture retention.

It will be obvious to those skilled in the art that various changes may be made without departing from the scope of the invention and the invention is not to be considered limited to what is described in the specification.

What we claim is:

1. A process for the production of starch syrups of low viscosity and high chemical stability and heat retention which comprises adding to a first low conversion starch syrup (A) obtained by acid or non-alpha-1,6-glucosidase enzyme hydrolyzation of starch, a second starch syrup selected from the group consisting of starch syrups, (B) consisting essentially of linear chained oligosaccharide molecules with a D.E. of less than 40 which are obtained by subjecting liquefied starch slurry to the action of α-1,6-glucosidase during the acidic or enzymatic saccharification procedure of (A), and starch syrups (C) consisting essentially of linear chained sugar alcohols which are obtained by hydrogenating the starch syrup (B).

2. A novel composition for use as an additive to foods and confections consisting essentially of the product obtained by the process of claim 1.

3. A process in accordance with claim 1 wherein said second starch syrup is starch syrup (B) and the resultant mixture contains between about 30 and about 50% of starch syrup (B).

4. A novel composition for use as an additive to foods and confections consisting essentially of the product obtained by the process of claim 3.

5. A process in accordance with claim 1 wherein said second starch syrup is starch syrup (C) and the resultant mixture contains between about 30 and about 50% of starch syrup (C).

6. A novel composition for use as an additive to foods and confections consisting esentially of the product obtained by the process of claim 5.

7. A process in accordance with claim 1 wherein said second starch syrup is starch syrup (B) and further comprising the step of hydrogenating the mixture of starch syrup (A) and starch syrup (B) to obtain a nonreducing starch syrup containing sugar alcohols of even lower viscosity and higher chemical stability and heat retention.

8. A novel composition for use as an additive to foods and confections consisting essentially of the product obtained by the process of claim 7.

References Cited
UNITED STATES PATENTS

| | | | |
|---|---|---|---|
| 3,335,013 | 8/1967 | Wolfmeyer | 99—142 X |
| 3,565,765 | 2/1971 | Heady | 195—31 R |
| 2,891,869 | 6/1959 | Langlois | 99—142 |
| 2,965,520 | 12/1960 | Snyder | 127—29 X |
| 3,137,639 | 6/1964 | Hurst | 99—142 X |
| 3,185,633 | 5/1965 | Krebs | 127—38 X |
| 3,285,776 | 11/1966 | Scallet | 127—38 X |
| 3,535,123 | 10/1970 | Heady | 99—142 |
| 3,560,343 | 2/1971 | Armbruster | 99—142 X |
| 2,968,680 | 1/1961 | Kasehagen | 260—635 C |
| 3,329,507 | 7/1967 | Conrad | 260—635 C |

MORRIS O. WOLK, Primary Examiner

S. MARANTZ, Assistant Examiner

U.S. Cl. X.R.

99—142; 127—38; 195—31 R; 260—635